United States Patent [19]
Sasada et al.

[11] Patent Number: 5,176,451
[45] Date of Patent: Jan. 5, 1993

[54] TEMPERATURE SENSOR

[75] Inventors: Katsumi Sasada, Nara; Kenzo Ohji, Ikoma; Yasukiyo Ueda, Nara, all of Japan

[73] Assignee: Matsushita Electric Industrial Co., Ltd., Osaka, Japan

[21] Appl. No.: 724,562

[22] Filed: Jun. 28, 1991

[30] Foreign Application Priority Data

Jul. 2, 1990 [JP] Japan ................. 2-175136

[51] Int. Cl.⁵ .................. G01K 1/08; G01K 7/04
[52] U.S. Cl. .................. 374/179; 374/208; 136/221; 136/230; 219/450
[58] Field of Search ........... 136/230, 232, 233, 217, 136/221; 374/208, 185, 179; 219/450

[56] References Cited

U.S. PATENT DOCUMENTS

| 3,153,769 | 10/1964 | Moses | 374/185 |
| 3,671,328 | 6/1972 | Dixon et al. | 136/230 |
| 3,956,936 | 5/1976 | Brixy | 136/233 |
| 4,241,289 | 12/1980 | Bowling | 219/450 |
| 4,321,827 | 3/1982 | Anderson | 374/165 |
| 4,614,443 | 9/1986 | Hamert | 136/230 |
| 4,770,545 | 9/1988 | Takada et al. | 374/208 |
| 4,812,624 | 3/1989 | Kern | 219/450 |

FOREIGN PATENT DOCUMENTS

| 0795434 | 9/1968 | Canada | 219/450 |
| 2376403 | 9/1978 | France | 136/232 |
| 0014727 | 1/1982 | Japan | 374/185 |
| 0573726 | 9/1977 | U.S.S.R. | 136/233 |

Primary Examiner—William A. Cuchlinski, Jr.
Assistant Examiner—Diego F. F. Gutierrez
Attorney, Agent, or Firm—Panitch, Schwarze, Jacobs & Nadel

[57] ABSTRACT

A temperature sensor for use in a heating apparatus is disclosed. The temperature sensor includes a rigid cylindrical body and upper and lower plates disposed at one end of the rigid cylindrical body. A first electrical insulator is interposed between the upper and lower plates and has a recess filled with a second electrical insulator, in which a hot junction of a thermocouple is buried. Since the respective components are just in contact with each other without any bonding therebetween, there arises no stress in the temperature sensor even at high temperatures. Furthermore, even if a short circuit occurs in the thermocouple, data indicating the short circuit is output from the temperature sensor to the control system of the heating apparatus, thereby assuring safety in the operation of the heating apparatus.

7 Claims, 6 Drawing Sheets

Page 5,176,451

TEMPERATURE SENSOR

BACKGROUND OF THE INVENTION

1. Field of the Invention

The present invention relates to a temperature sensor for a heating apparatus such as a portable cooking stove or gas range, and more particularly relates to a temperature sensor for measuring the temperature of a container such as a pot or pan placed on and heated by the heating apparatus, so as to control the combustion in the heating apparatus.

2. Description of the Prior Art

In recent years, combustion control systems for a heating apparatus such as a portable cooking stove or gas range have been greatly developed. In the combustion control for a heating apparatus, the temperature of a container such as a pot or pan placed on the heating apparatus is measured, so that the combustion in the heating apparatus is controlled in accordance with the measured temperature. With a combination of thermometry and electronic control technique in the combustion control technique, a heating apparatus including a combustion control system has become easier to operate.

Temperature sensors currently used for such a combustion control system include a sensor using a thermal element made of a semiconductor such as a ceramic, a sensor utilizing the expansion coefficient of a liquid, a bimetal made of different metals which allows electric contacts to open or to close, etc.

There are a variety of thermometric systems using temperature sensors. For example, in some thermometric systems, a temperature sensor is brought into contact with a pot or pan placed on a heating apparatus to measure the temperature thereof. In other systems, a temperature sensor is brought into contact with the food contained in a pot or pan placed on a heating apparatus so as to measure the temperature thereof.

With the development of such a temperature sensor, there has been an increasing demand for a heating apparatus having excellent operability and durability. However, a conventional temperature sensor having a thermal element of a ceramic such as SiC has a complicated structure and accordingly requires high production costs. Furthermore, the durability of this temperature sensor is poor because the ceramic used for the thermal element has a tendency to break on receiving thermal or mechanical shock. When this temperature sensor is incorporated into a heating apparatus, the lifetime of the heating apparatus becomes short because of the poor durability of the temperature sensor. A conventional temperature sensor utilizing the expansion coefficient of a liquid also has the disadvantage of having poor response to changes in temperature. When this temperature sensor is incorporated into a heating apparatus, the heating apparatus becomes difficult to operate because the temperature sensor has poor response to changes in the temperature of the container to be heated.

Thus, there is a great demand for an inexpensive heating apparatus which includes a temperature sensor and has a long lifetime and excellent operativity.

Figure 1:
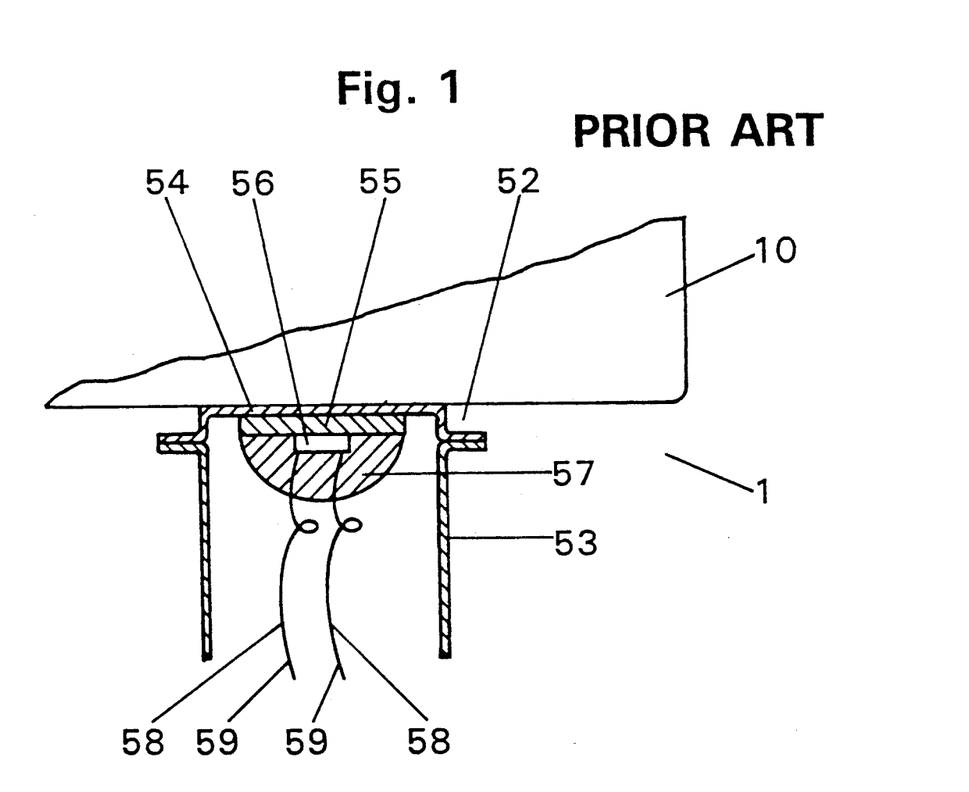
FIG. 1 is a sectional view showing a conventional temperature sensor.

Fig. 1 shows a conventional temperature sensor having a thermal element made of a ceramic such as SiC, which is incorporated in a heating apparatus 1. The temperature sensor 52 has a rigid cylindrical body 53 and a plate 54 mounted on one end of the rigid cylindrical body 53. An electrical insulator 55 is brazed to the lower face of the plate 54. A thermal element 56 is fixed to the electrical insulator 55 by means of a glass sealing 57. In this arrangement, the thermal element 56 is electrically insulated from the rigid cylindrical body 53 and the plate 54. A pair of leads 59 each coated with an electrical insulator 58 are connected to the thermal element 56 and extend downward from the glass sealing 57.

Since the thermal element 56 is electrically insulated from the rigid cylindrical body 53, it is not influenced by any noise generated from the discharge of an ignition device (not shown) for turning on a burner (not shown) of the heating apparatus 1, or from the electromotive force of a burner safety device (not shown). If the thermal element 56 is influenced by such a noise, the data output from the temperature sensor 52 becomes inaccurate, which causes malfunction of the heating apparatus 1.

The reference numeral 10 denotes a container to be heated by the heating apparatus 1. The plate 54 is in contact with the container 10 to conduct heat therefrom to the thermal element 56. The thermal element 56 then measures the temperature of the container 10 and sends data containing the measured result to a control system (not shown) of the heating apparatus 1 through the leads 59. On receiving the data, the control system controls the combustion in the heating apparatus 1.

When the container 10 is used for cooking tempura (Japanese deep-fried food) or the like, the temperature thereof reaches about 220° C. When the container 10 is a grill pan or frying pan on which food is grilled or broiled, the temperature thereof increases to about 280° C. In cases where the insulator 55 is made of a ceramic or the like, it is resistant to such high temperatures. However, when the container 10 is heated to such high temperatures, there arises difference in temperature among the plate 54, the insulator 55, the glass sealing 57 and the thermal element 56. This causes the respective components to have different expansion coefficients, which in turn brings about stress in the temperature sensor 52. The stress causes the glass sealing 57 which has poor mechanical strength to break.

Furthermore, the insulator 58 on each lead 59 is usually made of fluororesin or the like which is resistant to temperature of less than about 250° C. When the container 10 is heated to 250° C. or more, the insulator 58 is melted, which often causes the leads 59 to come into contact with each other and to be short-circuited. As a result, the data sent out from the temperature sensor 52 through the leads 59 become inaccurate. The inaccurate data makes it impossible to accurately control the combustion in the heating apparatus 1. Therefore, it is impossible to cook food at a temperature of 250° C. or more with use of the heating apparatus 1 including the temperature sensor 52.

SUMMARY OF THE INVENTION

The temperature sensor of this invention, which overcomes the above-discussed and numerous other disadvantages and deficiencies of the prior art, is incorporated in a heating apparatus to measure the temperature of a container to be heated by the heating apparatus, said temperature sensor comprising: a rigid cylindrical body; a first plate and a second plate both mounted on one end of the cylindrical rigid body, the second plate being positioned below and spaced apart from the first plate; a first electrical insulator interposed between the first and second plates and having a recess located toward the first plate; a second electrical insulator which fills the recess of the first electrical insulator; and a thermal element electrically insulated from the cylindrical rigid body and the first and second plates, part of the thermal element being buried in the second electrical insulator.

In a preferred embodiment, the thermal element includes a thermocouple having a pair of leads and a hot junction, and the part of the thermal element which is buried in the second electrical insulator includes the hot junction of the thermocouple, and at least one of the leads being covered with an insulating coating.

With the above-described arrangement, since the thermocouple is electrically insulated from the first and second plates and from the rigid cylindrical body, there can be no short circuits between the thermocouple and the first and second plates or between the thermocouple and the rigid cylindrical body.

In a preferred embodiment, the hot junction of the thermocouple is in contact with the second electrical insulator without any bonding therebetween, the first plate is in contact with the firt and second electrical insulators without any bonding therebetween which will inherently permit expansion and contraction of the first and second electrical insulators with respect to the first plate. and the second plate is in contact with the first electrical insulator without any bonding therebetween which will inherently permit expansion and contraction of the first insulator with respect to the second plate. Since the first and second plates and the hot junction are not bonded to the respective electrical insulators, no stress will arise in the temperature sensor even at high temperatures. This eliminates the possibility that the components of the temperature sensor will break at high temperatures.

In a preferred embodiment, an earth wire is wound around the insulating coating of at least one of the leads so as to cover the surface of the insulating coating. one end of the earth wire being electrically connected to the second plate. With this arrangement, even if the insulating coating is melted to expose the lead at high temperatures. no short circuit occurs between the two leads of the thermocouple, but could occur between the exposed lead and the earth wire. Data indicating the short circuit in the thermocouple will be output to the control system of the heating apparatus, so that the malfunction of the temperature sensor can be recognized. Accordingly, the heating apparatus can be turned off immediately after the short circuit arises, which assures the safety in the operation of the heating apparatus.

In a preferred embodiment, the thermocouple further includes another hot junction which is connected to said hot junction via a resistor, the hot junctions and the resistor being buried in the second electrical insulator. With this arrangement, even if the insulating coatings of the leads are melted so as to cause a short circuit between the leads at high temperatures, the resistor and the short-circuited portion of the leads are electrically connected in parallel. As a result, the resistance of the thermocouple becomes less than that of the resistor. Then, the data indicating the reduction in the resistance is sent to the control system of the heating apparatus, so that the malfunction of the temperature sensor can be recognized. Accordingly, the heating apparatus can be turned off immediately after the short circuit occurs in the temperature sensor.

In a preferred embodiment, the thermal element includes at least three leads which constitute a pair of thermocouples, the thermocouples having a hot junction in common which is buried in the second electrical insulator. If a short circuit occurs in one of the thermocouples at high temperatures, two different sets of data will be output from the temperature sensor to the control system of the heating apparatus. The two sets of data are recognized as an indication of the malfunction of the temperature sensor. Therefore, the heating apparatus can be turned off immediately after the short circuit occurs in the temperature sensor.

Thus, the invention described herein makes possible the objectives of (1) providing a temperature sensor having excellent heat resistance; and (2) providing a temperature sensor which outputs data indicating any short circuit arising therein into a control system of the heating apparatus, thereby assuring reliability and safety of the operation of the heating apparatus.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 2:
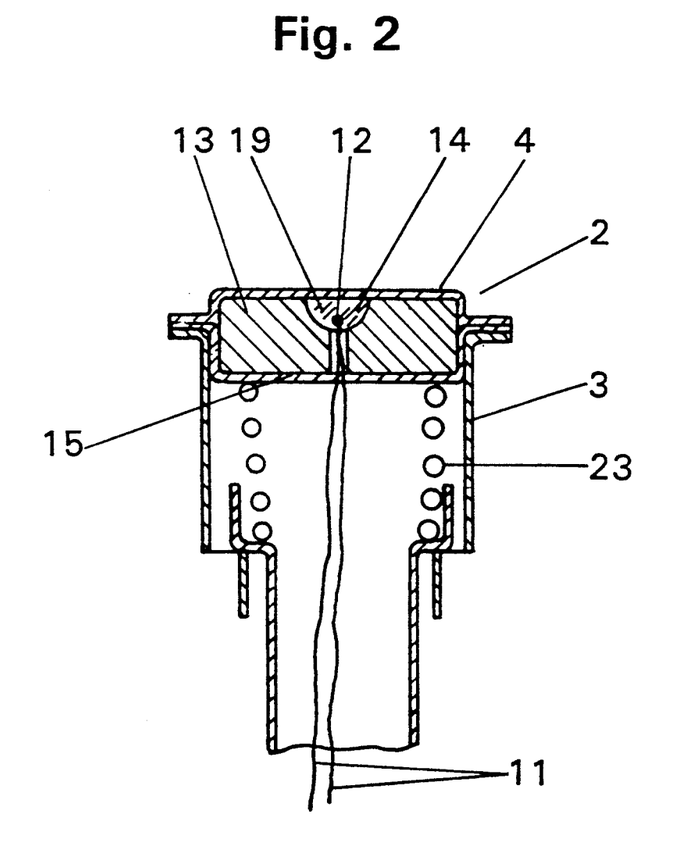
FIG. 2 is a sectional view showing a temperature sensor according to the present invention.

FIG. 2 shows a temperature sensor according to the present invention. The temperature sensor 2 includes a rigid cylindrical body 3 which has an upper plate 4 and a lower plate 15 both mounted on the upper end thereof. An electrical insulator 13 is interposed between the plates 4 and 15. The lower plate 15 is urged upward by a spring 23. The insulator 13 is provided with a recess 14 open toward the upper plate 4. The recess 14 is filled with an electrical insulator 19. The temperature sensor 2 also has a thermocouple 11 functioning as a thermal element. The thermocouple 11 includes a hot junction 12 which is located within the recess 14 and buried in the insulator 19.

Figure 3:
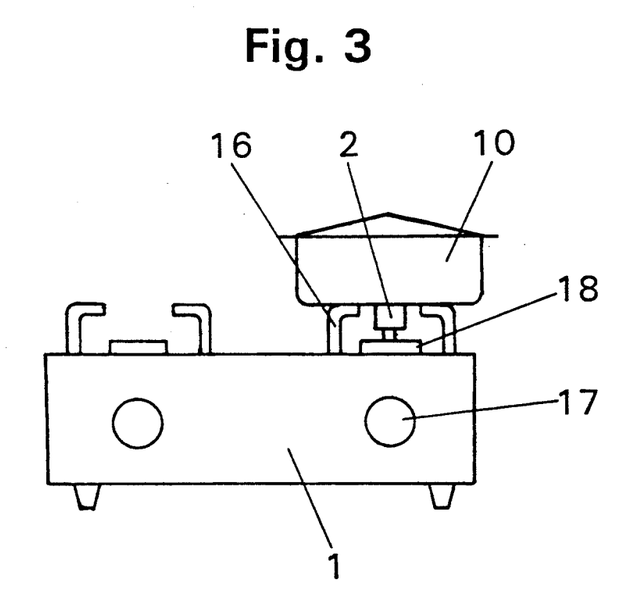
FIG. 3 is a front view showing a heating apparatus including the temperature sensor of FIG. 2.

FIG. 3 shows a heating apparatus including the temperature sensor 2 of FIG. 2. The heating apparatus 1 which is shown as a gas range has grates 16, burners 18 and burner control knobs 17. A container 10 such as a pot or pan to be heated by the heating apparatus 1 is placed on the grate 16. The temperature sensor 2 is positioned in the center of the burner 18.

By using the burner control knob 17, the burner 18 is allowed to fire through the discharge of an ignition device (not shown), so as to heat the container 10. The temperature sensor 2 is in contact with the container 10 to measure the temperature thereof. Data containing the measured result is output from the temperature sensor 2 to a control system (not shown) of the heating apparatus 1. The control system then controls the heating power of the burner 18 in accordance with the data.

In the temperature sensor 2, the hot junction 12 is in contact with the insulator 19, the lower plate 15 is in contact with the insulator 13, and the upper plate 4 is in contact with the insulators 13 and 19. However, the hot junction 12 and the plates 4 and 15 are in contact with the respective insulators 13 and 19 without any bonding therebetween. Thus, even when these components have different expansion coefficients at high temperatures, no stress is caused in the temperature sensor 2. This eliminates the possibility that the components in the temperature sensor 2 will break at high temperatures. Furthermore, the thermocouple 11 has high resistance to heat because it is made of metal, thereby eliminating the necessity of providing any means for protecting the hot junction 12 against heat. Therefore, tempura or such foods which should be prepared at high temperatures can be cooked with the use of the heating apparatus 1 including the temperature sensor 2 of this example.

Since the hot junction 12 of the thermocouple 11 is buried in the insulator 19 to be electrically insulated from the rigid cylindrical body 3 and the plates 4 and 15, no short circuit arises between the thermocouple 11 and the rigid cylindrical body 3 or between the thermocouple 11 and each plate 4 or 15. This eliminates the possibility that inaccurate data will be output from the temperature sensor 2. Thus, the reliable and safe operation of the heating apparatus 1 can be assured.

EXAMPLE 2

Figure 4:
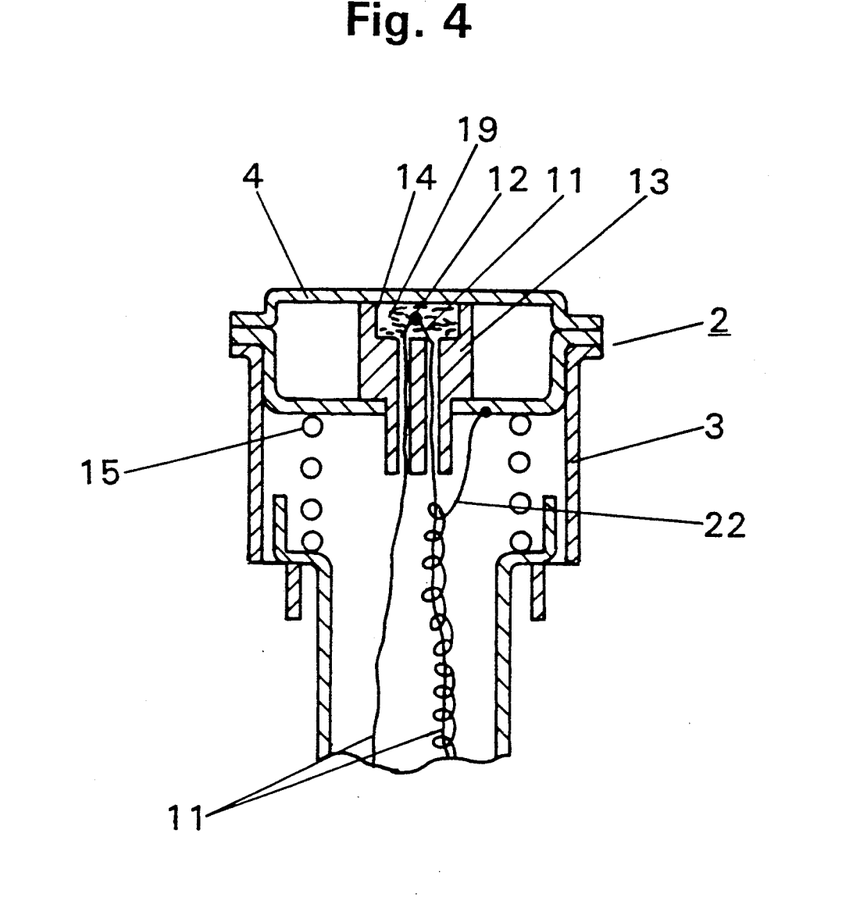
FIG. 4 is a sectional view showing another temperature sensor according to the present invention.

FIG. 4 shows another temperature sensor according to the invention. In the same manner as in Example 1, the temperature sensor 2 of this example has the thermocouple 11, which includes the hot junction 12 buried in the insulator 19 in the recess 14 of the insulator 13. In this example, an earth wire 22 is connected to the lower plate 15.

Figure 5:
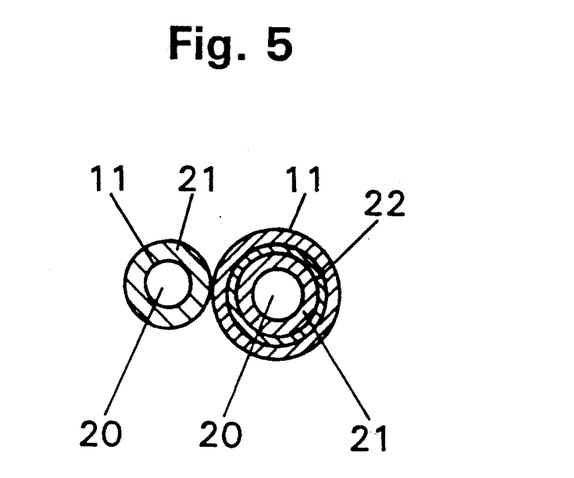
FIG. 5 is an enlarged view showing part of the temperature sensor of FIG. 4.

A cross section of the thermocouple 11 is shown in FIG. 5. The thermocouple 11 includes a pair of leads 20 each provided with an insulating coating 21. The earth wire 22 is wound around the insulating coating 21 of at least one of the leads 20, so as to cover the surface of the insulating coating 21. According to the present invention, it is not necessary to cover both the leads 20 with the insulating coatings 21; at least one of the leads 20 is required to be covered with the insulator coating 21.

In the temperature sensor 2 of this example, since the insulating coating 21 of one of the leads 20 is covered with the earth wire 22 as described above, a short circuit does not arise between the two leads 20 of the thermocouple 11 but arises between the thermocouple 11 and the earth wire 22 even if the insulating coatings 21 are melted at high temperatures. Since no short circuit occurs between the two leads 20 of the thermocouple 11, there is no possibility that inaccurate data will be output from the temperature sensor 2. When the thermocouple 11 and the earth wire 22 are short-circuited, data indicating the short circuit is sent out from the temperature sensor 2 into the control system of the heating apparatus, so that the malfunction of the temperature sensor 2 can be recognized. The heating apparatus is turned off immediately after the control system thereof receives such data. This assures safety in the operation of the heating apparatus.

EXAMPLE 3

Figure 6:
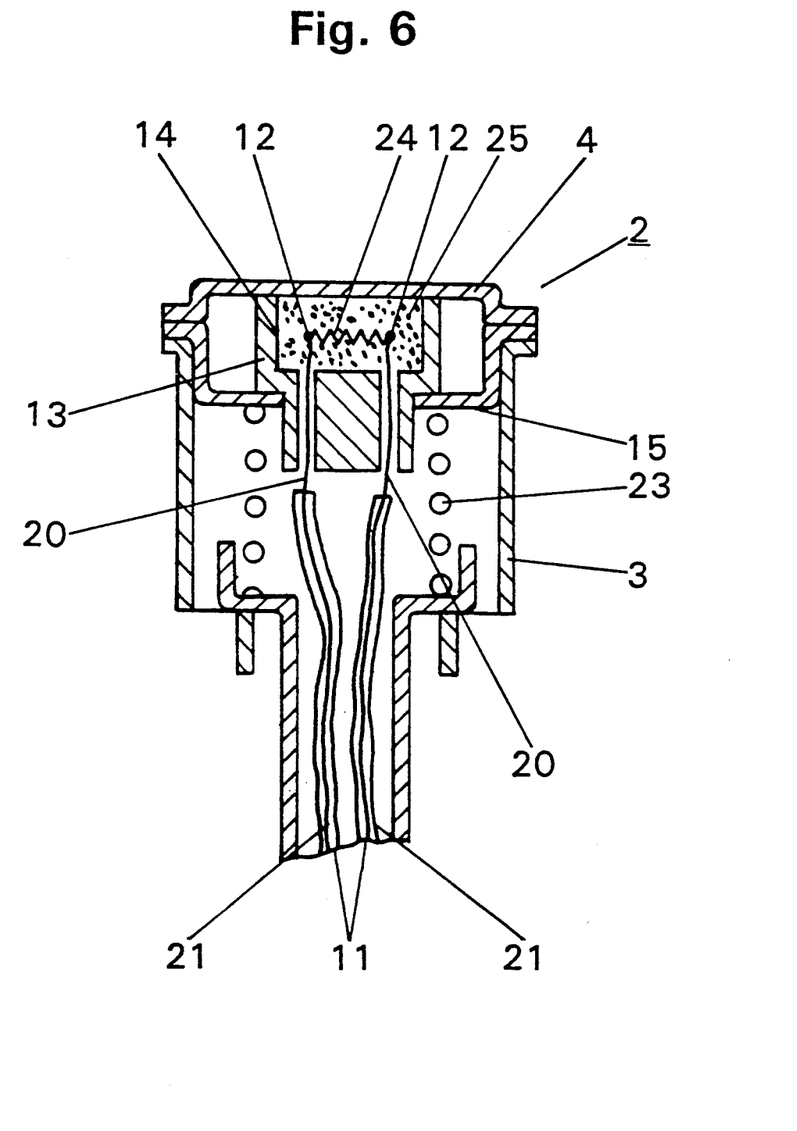
FIG. 6 is a sectional view showing still another temperature sensor according to the present invention.

FIG. 6 shows still another temperature sensor according to the invention. In the same manner as in Examples 1 and 2, the temperature sensor 2 of this example has the upper and lower plates 4 and 15 between which the insulator 13 is interposed. In this example, the recess 14 of the insulator 13 is filled with an insulating powder 25 made of, for example, magnesium oxide. The thermocouple 11 includes a pair of leads 20 each covered with an insulating coating 21, and also includes a pair of hot junctions 12 between which a resistor 24 is connected. The hot junctions 12 and the resistor 24 are buried in the insulating powder 25.

In the temperature sensor 2 of this example, if the insulating coatings 21 are melted to cause the two leads 20 to be short-circuited, the short-circuited portion of the leads 20 and the resistor 24 will be electrically connected in parallel. Thus, the resistance of the thermocouple 11 is reduced to a value less than that of the resistor 24. The resistance of the leads 20 is usually about 50Ω or less. In cases where the resistance of the resistor 24 is, for example, 100Ω, the resistance of the thermocouple 11 is reduced to a value less than 100Ω if a short circuit occurs between the two leads 20. Then, data indicating the resistance of less than 100Ω is output from the temperature sensor 2 into the control system of the heating apparatus, so that the malfunction of the temperature sensor 2 can be recognized. In this way, the short circuit arising in the thermocouple 11 can be detected by monitoring the resistance of the thermocouple 11. The heating apparatus is turned off immediately after the control system thereof receives the data indicating the short circuit. This assures safety in the operation of the heating apparatus.

EXAMPLE 4

Figure 7:
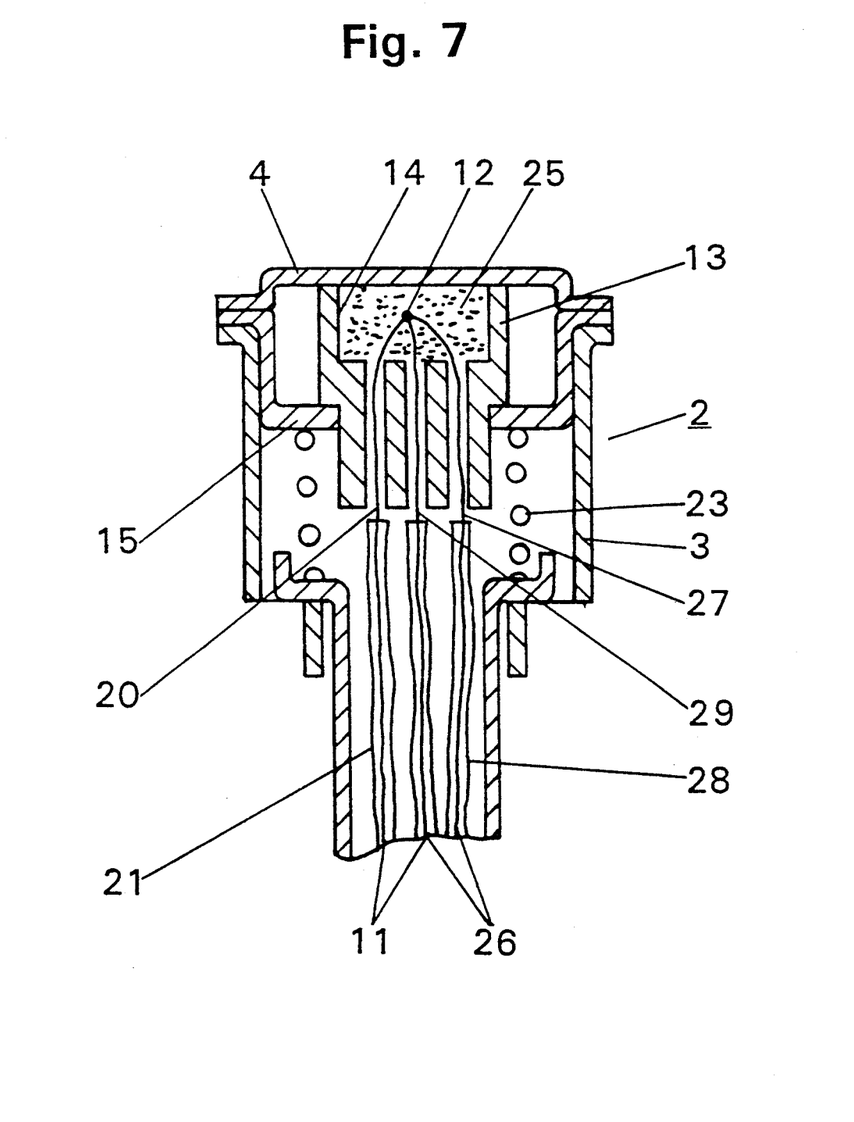
FIG. 7 is a sectional view showing a further temperature sensor according to the present invention.

FIG. 7 shows a further temperature sensor according to the present invention. In the same manner as in Examples 1 through 3, the temperature sensor 2 of this example has the upper and lower plates 4 and 15 between which the electrical insulator 13 is interposed. In the same manner as in Example 3, the recess 14 of the electrical insulator 13 is filled with the insulating powder 25.

The temperature sensor 2 of this example includes three leads 20, 27 and 29. The leads 20 and 29 constitute a thermocouple 11 while the leads 27 and 29 constitute a thermocouple 26. The thermocouples 11 and 26 have the lead 29 in common. The leads 20 and 27 are covered with electrical insulating coatings 21 and 28, respectively. The thermocouples 11 and 26 have a hot junction 12 in common, which is buried in the insulating powder 25.

In the temperature sensor 2 of this example, the measured results obtained by the thermocouples 11 and 26 are the same in the normal operation. However, if the insulating coating 21 of the thermocouple 11 is melted at high temperatures, the leads 20 and 29 are short-circuited. This causes the thermocouple 11 to output inaccurate data, while the thermocouple 26 outputs accurate data. As a result, two different sets of data are output from the temperature sensor 2 into the control system of the heating apparatus. The two sets of data are not recognized as the data of the measured temperature, but recognized as the indication of a malfunction of the temperature sensor 2. Immediately after the control system of the heating apparatus receives the two different sets of data, the heating apparatus is turned off. In this way, the temperature sensor 2 of this example assures safety in the operation of the heating apparatus.

In this example, any short circuit in the temperature sensor 2 can be recognized by monitoring the data output therefrom, unless the insulating coatings 21 and 28 are both melted to cause short circuits between the leads 20, 27 and 29. Since the temperature sensor 2 of this example has two thermocouples 11 and 26, the safety in the operation of the heating apparatus including this temperature sensor 2 is further assured, as compared with a heating apparatus including a conventional temperature sensor having a single thermocouple.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A temperature sensor comprising:
   a cylindrical rigid body;
   a first plate and second plate both mounted on one end of the cylindrical rigid body, the second plate positioned below and spaced apart from the first plate;
   a first electrical insulator interposed between the first and second plates and having a recess located toward the first plate, the first electrical insulator not being bonded to either the first or second plates;
   a second electrical insulator which fills the recess of the first electrical insulator and is not bonded to the first plate; and
   a thermal element electrically insulated from the cylindrical rigid body and the first and second plates, part of the thermal element being buried in the second electrical insulator.

2. A temperature sensor according to claim 1, wherein the thermal element includes a thermocouple having a pair of leads and a hot junction, and the part of the thermal element which is buried in the second electrical insulator includes the hot junction of the thermocouple, at least one of the leads being covered with an insulating coating.

3. A temperature sensor according to claim 2, wherein the hot junction of the thermocouple is in contact with the second electrical insulator without any bonding therebetween, the first plate is in contact with the first and second electrical insulators, and the second plate is in contact with the first electrical insulator.

4. A temperature sensor according to claim 3, wherein an earth wire is wound around the insulating coating of at least one of the leads so as to cover the surface of the insulating coating, one end of the earth wire being electrically connected to the second plate.

5. A temperature sensor according to claim 3, wherein the thermocouple further includes another hot junction which is connected to said hot junction via a resistor, the hot junctions and the resistor being buried in the second electrical insulator.

6. A temperature sensor according to claim 1, wherein the thermal element includes at least three leads which constitute a pair of thermocouples, the thermocouples having a hot junction in common which is buried in the second electrical insulator.

7. A temperature sensor comprising:
   a cylindrical rigid body;
   a first plate and a second plate each mounted at one end of the cylindrical rigid body, the first and second plates defining a volume therebetween;
   a first electrical insulator not bonded to either the first or second plates and disposed in the volume so as to be permitted to expand and to contract relative to the first and second plates, the first electrical insulator including a recess opening toward the first plate;
   a second electrical insulator not bonded to the first plate and which substantially fills the recess and is permitted to expand and to contract relative to the first plate; and
   a thermal sensing element electrically insulated from the cylindrical rigid body and the first and second plates, part of the thermal sensing element being buried in the second electrical insulator.

* * * * *